Patented July 1, 1947

2,423,128

UNITED STATES PATENT OFFICE 2,423,128

GLASS COMPOSITION AND METHOD OF MAKING SAME

Edgar D. Tillyer, Southbridge, Mass., assignor to American Optical Company, Southbridge, Mass., a voluntary association of Massachusetts No Drawing. Application December 11, 1943, Serial No. 513,954

2 Claims. (Cl. 106—54)

This invention relates to improvements in glass and has particular reference to novel compositions, glasses resulting from said compositions and methods of making the same.

One of the principal objects of the invention is to provide stable, substantially colorless glasses having relatively high transmission as to the visible and ultra-violet portions of the spectrum and novel compositions and methods of producing such glasses.

Another object is to provide glasses having the above characteristics which are readily workable and easily melted and annealed with standard glass forming apparatus.

Another object is to provide glasses having the above characteristics which may be reheated for subsequent reforming with no tendency toward crystallization during said reforming.

Another object is to provide a stable glass having relatively high ultra-violet transmission rendering said glass particularly adaptable for use as window lights in solariums and for various other scientific applications and novel methods of making the same.

Other objects and advantages of the invention will become apparent from the following description and it will be apparent that changes in the compositions and characteristics of the glass may be made without departing from the spirit of the invention as expressed in the accompanying claims. I, therefore, do not wish to be limited to the exact compositions and glasses set forth herein as the preferred forms and methods only have been given by way of illustration.

Glasses having relatively high transmission to ultra-violet light are not new in the art. Such prior art glasses, however, in most instances, possessed other undesirable characteristics which rendered them impractical for general uses. For example, it has been possible to obtain a substantially colorless glass having a relatively high transmission as to the visible portion of the spectrum and a high transmission as to the ultra-violet portion of the spectrum but such prior art glasses were not stable and not practical for use as window lights or other similar uses. Other glasses, although practical from the stand-point of stability, were difficult to fabricate with standard commercial glass forming equipment.

The present invention, therefore, is directed particularly to the provision of a glass or glasses possessing the stable and substantially colorless characteristics desired and yet having high transmission as to the visible and ultra-violet portions of the spectrum while overcoming all of the above mentioned difficulties set forth in connection with known prior art glasses.

One of the glasses embodying the invention, which is particularly adapted for use as window lights, therapeutic purposes, lenses or other scientific uses, comprises,

| | Parts by weight |
|---|---|
| $P_2O_5$ (phosphorous pentoxide) | 70 |
| $SiO_2$ (silica) | 5 |
| $Al_2O_3$ (alumina) | 13 |
| $B_2O_3$ (boric oxide) | 5 |
| CaO (calcium oxide) | 7 | with the addition of suitable means to keep any iron in the ferrous condition such as the addition of a suitable reducing agent such as fine graphite, ammonium phosphate, ammonium chloride, carborundum, a phosphide, or by having a reducing atmosphere in the furnace or both.

This glass has a visible ray transmission of about 92 per cent and the ultra-violet is transmitted to about 240 millimicrons for the 5% cut-off, at a thickness of about 2 millimeters. The said glass is substantially colorless and has a chemical stability which is unusually good as shown by standard laboratory tests for chemical durability. Only approximately 1% of the powdered glass is dissolved in an extractor on 8 hours treatment compared to 4 to 8% dissolved from ordinary known commercal bottle and window glass and upon ten minutes immersion in hydrochloric acid at room temperature has a stability which approximates the ordinary known glasses mentioned above. Refractive index is about 1.52 for the D line with a relative reciprocal dispersion value of about 68, and which is a very useful optical position.

Variations of the preferred composition may be made as follows:

| | Parts by weight |
|---|---|
| $P_2O_5$ (phosphorous pentoxide) | 50 to 75 |
| $SiO_2$ (silica) | 2 to 10 |
| $Al_2O_3$ (alumina) | 8 to 16 |
| $B_2O_3$ (boric oxide) | 1 to 10 |
| CaO (calcium oxide) | 2 to 10 |

$Al_2O_3$ (alumina) may be all or partly replaced by BeO (beryllia). The CaO (calcium oxide) may be partly replaced with MgO (magnesia) as limestone, the source of CaO, often contains considerable magnesia. Not more than half of the CaO may be replaced by MgO.

A very desirable feature of this glass is its low thermal, expansion coefficient. Its thermal expansion coefficient has been found to be slightly more than $5 \times 10^6$ per degree C. This is recognized as being approximately half the value for ordinary glass and confers remarkable heat shock resisting characteristics.

The glasses resulting from the combined ingredients set forth above are particularly desirable because of ease of fabrication, both as to melting, annealing, etc., with the use of standard glass forming apparatus. This is particularly advantageous in that the glass is annealed substantially within the range of some of the ordinary types of glasses. The ordinary standard glass melting pots may also be used in forming said glasses. The resultant glasses are also particularly desirable in that they may be readily reworked without danger of crystallization.

The invention is basically directed to the provision of substantially colorless glass having the relatively high ultra-violet transmission characteristics set forth above as well as a relatively high transmission as to the visible portion of the spectrum.

It is to be understood that if desired various coloring oxides, such as nickel, cobalt and chromium may be added to the glass batch for specific absorption purposes without greatly imparing the ultra-violet transmission.

From the foregoing description, it will be seen that simple, efficient and economical means and methods have been provided for accomplishing all of the objects and advantages of the invention.

Having described my invention, I claim:

1. A glass resulting from the fusing together of

| | Parts by weight |
|---|---|
| $P_2O_5$ (phosphorous pentoxide) Approximately | 70 |
| $SiO_2$ (silica) Approximately | 5 |
| $Al_2O_3$ (alumina) Approximately | 13 |
| $B_2O_3$ (boric oxide) Approximately | 5 |
| CaO (calcium oxide) Approximately | 7 | and containing a suitable reducing agent.

2. The method of forming a glass composition comprising the fusing together of

| | Parts by weight |
|---|---|
| $P_2O_5$ (phosphorous pentoxide) Approximately | 70 |
| $SiO_2$ (silica) Approximately | 5 |
| $Al_2O_3$ (alumina) Approximately | 13 |
| $B_2O_3$ (boric oxide) Approximately | 5 |
| CaO (calcium oxide) Approximately | 7 | and a suitable reducing agent.

EDGAR D. TILLYER.

REFERENCES CITED

The following references are of record in the file of this patent:

UNITED STATES PATENTS

| Number | Name | Date |
|---|---|---|
| 1,830,902 | Hood | Nov. 10, 1931 |
| 1,961,603 | Berger | June 5, 1934 |
| 2,077,481 | Huppert et al. | Apr. 20, 1937 |
| 2,200,958 | Krefft et al. | May 14, 1940 |
| 2,177,728 | Krefft et al. | Oct. 31, 1939 |
| 2,100,391 | Grimm et al. | Nov. 30, 1937 |

FOREIGN PATENTS

| Number | Country | Date |
|---|---|---|
| 424,366 | Great Britain | 1935 |